(12) United States Patent
Hackman et al.

(10) Patent No.: US 6,357,160 B1
(45) Date of Patent: Mar. 19, 2002

(54) APPARATUS FOR AND A METHOD OF ATTRACTING WATERFOWL

(76) Inventors: James Paul Hackman; Jacob James Hackman, both of 2515 Old River Rd., Springfield, IL (US) 62707

( * ) Notice: Subject to any disclaimer, the term of this patent is extended or adjusted under 35 U.S.C. 154(b) by 0 days.

(21) Appl. No.: 09/499,659

(22) Filed: Feb. 8, 2000

(51) Int. Cl.[7] ............................................. A01M 31/06
(52) U.S. Cl. ........................................................... 43/2
(58) Field of Search ............................................ 43/2, 3

(56) References Cited

U.S. PATENT DOCUMENTS

| | | | | |
|---|---|---|---|---|
| 512,810 A | * | 1/1894 | Curlin | |
| 1,190,872 A | * | 7/1916 | Dildine | |
| 1,562,625 A | * | 11/1925 | Fife | |
| 1,629,442 A | * | 5/1927 | Geisinger | |
| 2,028,849 A | * | 1/1936 | Shay | |
| 2,129,781 A | * | 9/1938 | Park et al. | |
| 2,341,028 A | * | 2/1944 | Fay | |
| 4,228,977 A | * | 10/1980 | Kite | 43/2 |
| 4,340,192 A | | 7/1982 | Burris, III | |
| 4,651,457 A | | 3/1987 | Nelson et al. | |
| 5,003,722 A | | 4/1991 | Berkley et al. | |
| 5,172,507 A | | 12/1992 | Franceschini | |
| 5,732,500 A | * | 3/1998 | Fitzpatrick | 43/4 |
| 6,044,581 A | * | 4/2000 | Shipman et al. | |
| 6,095,458 A | * | 8/2000 | Cripe | |

* cited by examiner

Primary Examiner—Thomas Price
(74) Attorney, Agent, or Firm—William O'Driscoll

(57) ABSTRACT

A device and system for, and a method of attracting waterfowl. The method comprises the steps of: providing a lighter than air object; attaching a deployable retainer to the lighter than air object; releasing the lighter than air object proximal a waterfowl landing area; allowing the lighter than air object to deploy to an area downwind of the waterfowl landing area; and retrieving the lighter than air object from the downwind area to the waterfowl landing area.

16 Claims, 1 Drawing Sheet

APPARATUS FOR AND A METHOD OF ATTRACTING WATERFOWL

BACKGROUND OF THE INVENTION

The present invention is directed to an apparatus and a method for attracting waterfowl. More specifically, the present invention is directed to a method, a system, and a device for bringing waterfowl to an area proximal a waterfowl hunter to enable the waterfowl hunter to attempt to kill the waterfowl.

Waterfowl hunters typically set up in an area perceived to be attractive to a particular species of waterfowl. These species of waterfowl include geese and ducks. The hunter waits in a boat, a blind disguised in reeds or bushes, or in an arrangement suitable for hunting waterfowl. The hunter is often located adjacent a watery locale such as a pond or lake, and preferably is situated with clear visiblity and a clear shot at an upwind approach zone typical for waterfowl in making landings.

The waterfowl hunter waits for the approach of a desired waterfowl, and then attempts to kill the waterfowl with an appropriate weapon when the waterfowl enters a killing zone. The killing zone may be the watery locale, the upwind approach zone, or a take off zone. To attract waterfowl, the waterfowl hunter may place lures in the watery locale to indicate to waterfowl flying overhead that the watery locale is a desirable area for waterfowl. These lures are preferably floating lures which float in the killing zone and attract passing waterfowl to land there. Additionally, waterfowl hunters have been known to fly kites in an attempt to attract waterfowl to the killing zone. Kites require fairly strong wind, tend to bob and weave in a non-bird like manner, and require constant operator control.

SUMMARY OF THE INVENTION

It is an object, a feature, and an advantage of the present invention to overcome the problems of the prior art.

It is an object, a feature, and an advantage of the present invention to provide a method, a system, and a device for bringing waterfowl to an area proximal a waterfowl hunter.

It is an object, a feature, and an advantage of the present invention to indicate to waterfowl flying overhead that a watery locale is a desirable area for waterfowl.

It is an object, a feature, and an advantage of the present invention to provide a lighter than air lure which leads passing waterfowl to a desired area.

It is an object, a feature, and an advantage of the present invention to provide a lighter than air lure which indicates to passing waterfowl that a desired area is used by other waterfowl.

It is an object, a feature, and an advantage of the present invention to provide a lighter than air lure which better mimics the traits of flying waterfowl.

The present invention provides a system for attracting waterfowl. The system comprises: a lighter than air object; a deployable retainer attached to the lighter than air object; and a retrieval device operably connected to the deployable retainer and controlling the degree of deployment. The retrieval device preferably includes a fishing rod and reel. The deployable retainer includes a fishing line having an anchor end affixed to the fishing reel and a free end affixed to the lighter than air object.

The present invention also provides a method of attracting waterfowl. The method comprises the steps of: providing a lighter than air object, attaching a deployable retainer to the lighter than air object, releasing the lighter than air object proximal a waterfowl landing area, allowing the lighter than air object to deploy to an area downwind of the waterfowl landing area, and retrieving the lighter than air object from the downwind area to the waterfowl landing area.

The present invention further provides a waterfowl attractor. The attractor comprises: a body having a shape and an interior wherein the interior is filled with a lighter than air gas. The attractor shape is preferably avian in form.

DETAILED DESCRIPTION OF THE DRAWING

Figure 1:
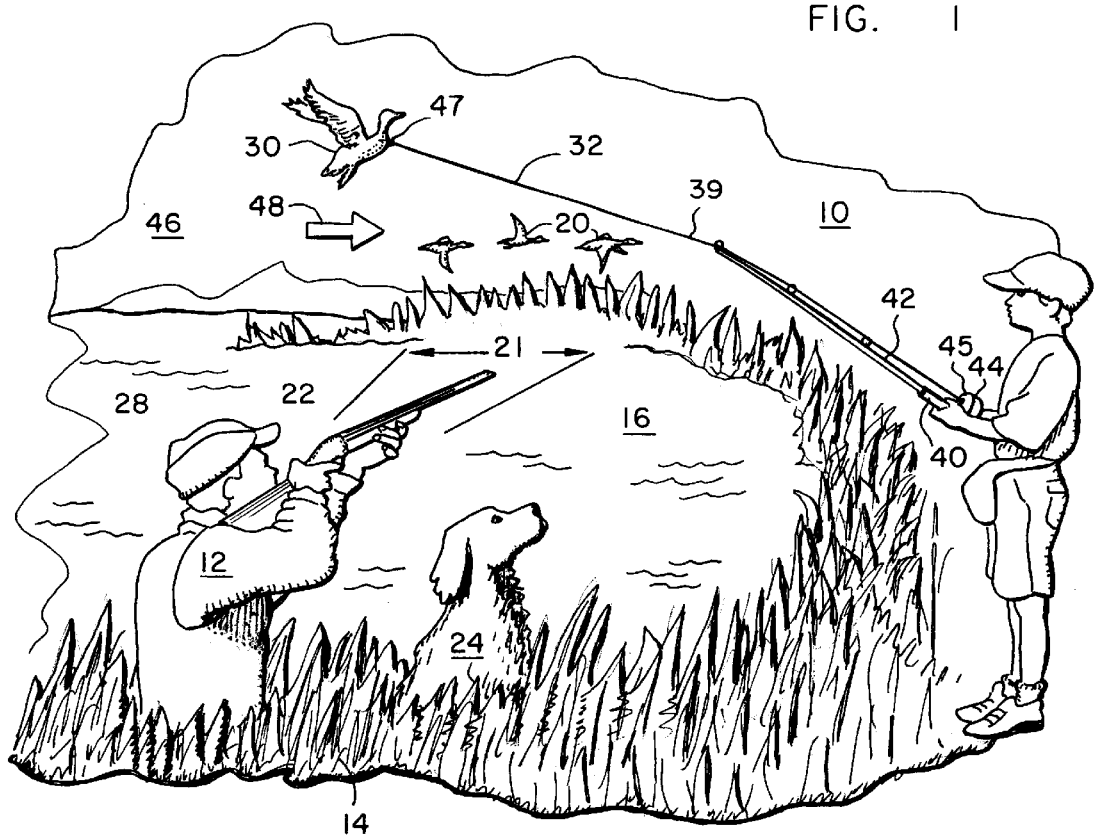
FIG. 1 is a perspective of a waterfowl hunting scene in accordance with the present invention.

FIG. 1 shows a waterfowl hunting scene 10 including a waterfowl hunter 12, a hunting area 14, and a kill area 16., The present invention is directed to a method, a system, and a device for bringing waterfowl 20 to the kill area 16 proximal the waterfowl hunter 12 to enable the waterfowl hunter 12 to attempt to kill the waterfowl 20 using a weapon 22 such as a shotgun. A dog 24 may be used as a retriever of waterfowl 20 after the waterfowl 20 has been shot.

Waterfowl hunters 12 typically set up in a hunting area 14 perceived to be attractive to a particular species of waterfowl 20. The hunter 12 waits in a boat, in a disguised blind, in reeds or bushes, or in a camouflaged arrangement. The hunter 12 is often adjacent a watery locale 28 such as a pond or lake, and preferably is situated so that the hunter's line of fire 21 includes the upwind line of approach typical of waterfowl landings. The waterfowl hunter 12 waits patiently for the approach of a desired waterfowl 20, and then attempts to kill the waterfowl 20 with the weapon 22 when the waterfowl 20 enters the kill area 16.

The present invention provides an improved method, a system, and device for bringing waterfowl 20 to the kill area 16 proximal the waterfowl hunter 12 by attracting the waterfowl 20 to the kill area 16. A mobile, lighter than air lure acting as a lure 30 is provided and manipulated to indicate to waterfowl 20 flying overhead that the watery locale 28 is a desirable area for waterfowl 20. The lure 30 is used to lead passing waterfowl 20 to the desired watery locale 28 and into a line of fire 21.

The system for attracting waterfowl includes the mobile lighter than air lure 30; and a deployable retainer assembly 39 attached to the lure 30. The retainer assembly 39 includes a deployable retainer 32 and a restraint and retrieval device 40 operably connected to the deployable retainer 32 and controlling the magnitude of deployment. The retrieval device 40 is preferably and economically implemented as a fishing rod 42 and a reel 44. The deployable retainer 32 includes a fastener having an anchor end affixed to the fishing reel 44 and a free end affixed to the lure 30.

The movable, lighter than air lure 30 is connected by the fastener 32, preferably by a light weight fishing line, to the restrain and retreival device 40. In the preferred embodiment, the restrain and retreival device 40 is a conventional fishing rod 42 and reel 44. A rod and reel sold under the trademark Zebco will suffice. Alternatively, a kite spool or a more complex motorized arrangement can be used. A more complex motorized arrangement includes a hoist, a power winch, or a garage door opener which also allows single person, remote operation.

The restrain and retreival device 40 functions to (1) allow the lure 30 to be deployed by playing out the line, (2)

restrains the lure 30 in a desired position 46 downwind of the watery locale 28 until waterfowl 20 are detected, and (3) allows the lure 30 to be reeled in with a movement pattern mimicing the landing of an actual waterfowl 20. The upwind movement of the lure 20 into the wind 48 and in a descending manner is a natural movement pattern indicating to other waterfowl 20 that the watery locale 28 is desirable. The other waterfowl 20 observing this natural movement pattern tend to also land in the watery locale 28 thus providing the kill area 16 for the hunter 12. Basically, by better mimicing the traits of flying waterfowl, the lighter than air lure 30 signals to passing waterfowl 20 that a watery locale 28 is used by other waterfowl.

Figure 2:
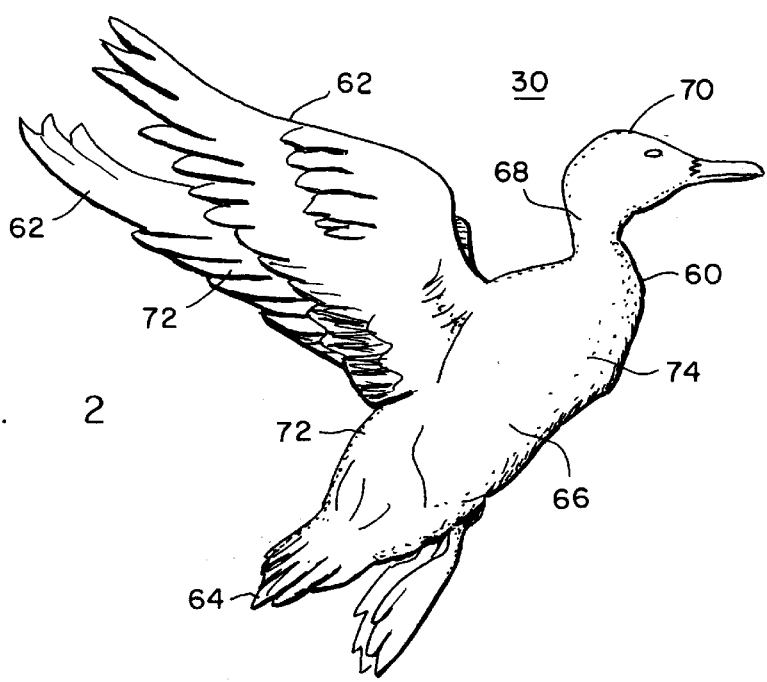
FIG. 2 is a drawing of the present invention in use.

FIG. 2 shows the lure 30 in more detail. The lure 30 preferably has an avian or a birdlike shape or form 60 including a pair of wings 62, a tail 64, a body 66, and the neck 68 and head 70 characteristic of waterfowl. However, other shapes are contemplated including a disklike shape such as is seen in a typical Mylar balloon, or the round or teardrop shape of a latex balloon. The colors, profiles, and patterns of the lure 30 are preferably similar to that of waterfowl including earthtones, darker upper bodies 72, and lighter lower bodies 74.

In operation, the present invention is implemented as follows:

First, the hunter 12 is positioned proximal kill area 16. Next, the lure 30 is taken to an area upwind of or proximal the kill area 16. The lure 30 is released but restrained by the restraint system. The lure 30 is played out, and manipulated to an area 46 downwind of kill area 16. A watch is kept for waterfowl 20 flying near the kill area 16. When the appropriate waterfowl 20 is observed, the lure 30 is reeled in against the wind 48 and descending toward the kill area 16. If the passing waterfowl 20 are attracted to the kill area 16 and make a landing approach, the hunter 12 attempts to kill the waterfowl 20 with the weapon of choice 22.

Manipulating the lure 30 includes attaching a deployable retainer 32 to the lighter than air lure 30, releasing the lighter than air lure 30 proximal a waterfowl landing area 28, allowing the lighter than air lure 30 to deploy to the area 46 downwind of the waterfowl landing area 28, and retrieving the lighter than air lure 30 from the downwind area 46 to the waterfowl landing area 28.

What has been described is an improved and more efficient approach to killing waterfowl. It will be apparent to a person of ordinary skill in the art that modifications and alterations can be made within the spirit of the invention. Such modifications include shaping the lighter than air object into the shape of a desired waterfowl including duck or geese shaopes, profiles, and colorations. All such modifications and alterations are intended to fall within the scope of the invention.

What is desired to be secured as Letters Patent of the United States of America is set forth in the following claims.

What is claimed is:

1. A method of attracting waterfowl, comprising the steps of:

Providing a lighter than air lure;

Attaching a deployable retainer to the lighter than air lure;

Releasing the lighter than air lure proximal a waterfowl landing area;

Allowing the lighter than air lure to deploy to an area downwind of the waterfowl landing area; and Retrieving the lighter than air lure from the downwind area to the waterfowl landing area.

2. The method of claim 1 wherein the attaching step includes the further step of using a fishing rod, line, and reel, tyeing a free end of the fishing line to the lighter than air lure, and reeling in the lure with a movement pattern mimicing the landing of an actual waterfowl.

3. The method of claim 2 wherein the retrieving step includes the further step of reeling the lighter than air lure in into the wind and in a descending manner.

4. The method of claim 3 wherein the providing step includes the further step of shaping the lighter than air lure into the shape of a desired waterfowl.

5. The method of claim 4 wherein the shaping step includes the further step of forming the lighter than air lure as a duck or as a goose.

6. The method of claim 5 wherein the shaping step includes the further step of coloring the lighter than air lure as a duck or as a goose.

7. The method of claim 1 including the further steps of shaping the lighter than air lure into the shape of a desired waterfowl, restraining the lure in a desired position downwind of the waterfowl landing area, and reeling the lure in with a movement pattern mimicing the landing of an actual waterfowl.

8. The method of claim 7 including the further step of moving the lure upwind into the wind and in a descending natural movement pattern indicating to other waterfowl that the waterfowl landing area is desirable.

9. The method of claim 8 wherein the shaping step includes the further step of coloring the lighter than air lure as a duck or as a goose.

10. A system for attracting waterfowl, comprising:

a lighter than air lure;

a deployable retainer attached to the lighter than air lure;

a retrieval device operably connected to the deployable retainer and controlling the degree of deployment; and means for moving the lure into the wind while mimicing the traits of flying waterfowl and thereby signalling to passing waterfowl that a watery locale is used by other waterfowl.

11. The system of claim 10 wherein the retrieval device includes a fishing rod and reel.

12. The system of claim 11 wherein the deployable retainer includes a fishing line having an anchor end affixed to the fishing reel and a free end affixed to the lighter than air lure.

13. The system of claim 12 wherein the lighter than air lure has the shape of a desired waterfowl.

14. The system of claim 13 wherein the lighter than air lure has the shape of a duck or as a goose.

15. The system of claim 14 wherein the lighter than air lure has the coloration of a duck or as a goose.

16. The system of claim 10 wherein the lighter than air lure has the shape and coloration of a duck or as a goose.

* * * * *